(12) United States Patent
Lauk et al.

(10) Patent No.: US 7,456,316 B2
(45) Date of Patent: Nov. 25, 2008

(54) ANTHRAQUINONE DYES

(75) Inventors: Urs Lauk, Zürich (CH); Patric Nowack, Lörrach (DE)

(73) Assignee: Huntsman International LLC, The Woodlands, TX (US)

( * ) Notice: Subject to any disclaimer, the term of this patent is extended or adjusted under 35 U.S.C. 154(b) by 505 days.

(21) Appl. No.: 10/508,714

(22) PCT Filed: Mar. 13, 2003

(86) PCT No.: PCT/EP03/02616

§ 371 (c)(1), (2), (4) Date: Sep. 20, 2004

(87) PCT Pub. No.: WO03/080734

PCT Pub. Date: Oct. 2, 2003

(65) Prior Publication Data

US 2005/0150061 A1 Jul. 14, 2005

(30) Foreign Application Priority Data

Mar. 22, 2002 (EP) .................... 02405226

(51) Int. Cl.
*C07C 211/00* (2006.01)
(52) U.S. Cl. ...................... 564/305
(58) Field of Classification Search ............... 564/305
See application file for complete search history.

(56) References Cited

U.S. PATENT DOCUMENTS

| | | | |
|---|---|---|---|
| 2,434,765 A | 1/1948 | Grossman | 260/378 |
| 2,487,045 A | 11/1949 | Dickey et al. | |
| 3,413,257 A | 11/1968 | Bowman et al. | 260/40 |
| 3,434,792 A | 3/1969 | Lewis | |
| 3,488,195 A | 1/1970 | Hunter | 96/84 |
| 3,549,666 A | 12/1970 | Vellins | |
| 3,562,299 A | 2/1971 | Harvey | |
| 3,734,934 A | 5/1973 | Kolliker et al. | |
| 4,124,355 A | 11/1978 | Greenhalgh et al. | 8/2.5 |
| 4,436,526 A | 3/1984 | Niwa et al. | |
| 2004/0040099 A1 | 3/2004 | Sutter et al. | 8/643 |
| 2004/0045102 A1 | 3/2004 | Hildebrand et al. | 8/509 |
| 2004/0068808 A1 | 4/2004 | Hildebrand et al. | 8/529 |

FOREIGN PATENT DOCUMENTS

| | | |
|---|---|---|
| CH | 325464 | 12/1957 |
| DE | 2123454 | 11/1972 |
| EP | 0323184 | 7/1989 |
| FR | 1516828 | 2/1968 |
| FR | 1530985 | 6/1968 |
| FR | 2137658 | 12/1972 |
| FR | 2438111 | 4/1980 |
| GB | 530817 | 4/1944 |
| GB | 1067538 | 5/1967 |
| GB | 1078092 | 8/1967 |
| GB | 1367933 | 9/1974 |
| GB | 2034358 | 6/1980 |
| GB | 2101624 | 1/1983 |
| JP | 36000284 | * 1/1961 |
| JP | 57-090081 | 6/1982 |
| JP | 63-268768 | 7/1988 |
| JP | 63-249693 | 10/1988 |
| NL | 6510298 | * 2/1965 |

OTHER PUBLICATIONS

Chemical Abstract vol. 77, No. 26, (1972), No. 166060j for JP 7213385.
Patent Abstracts of Japan Publication No. 63268768, (1988).
Chemical Abstract vol. 95, No. 6, (1981), No. 98845p for JP 8147438.
Chem. Abstr. 1973:44968 for DE 2123454 (1972).
Chem. Abstr. 1958:119508 for CH 325464 (1957).
Chem. Abstr. vol. 82, No. 16, (1975) No. 100043c for Rev. Chim. (1974), vol. 25, No. 11, pp. 873-875.
F.N. Stepanov et al., "Hydroxyl-containing aminoanthraquinone derivatives," Zh. Org. Khim. 10, 579-583 (1974).
Ya. B. Shteinberg, et al., "Synthesis of 2-chloro-1-amino-4-aryl(alkyl)-aminoanthraquinones and their use as dyes," Zh. Prikl. Khim. 53, 2608-1612 (1980).

* cited by examiner

*Primary Examiner*—Kamal A Saeed

(57) ABSTRACT

The present invention relates to a compound of formula (I) wherein $R_1$ is a radical of formula (II) $R_2$ is —$NH_2$ or a radical of formula (II), $R_3$ and $R_4$ are each independently of the other hydrogen, hydroxy, —$NH_2$ or a radical of formula (II), $R_5$ is hydrogen, halogen or —X—$(CH_2)_n$—Y, wherein X is a direct bond, —O— or —S—, Y is —OH or —$OSO_3H$ and n is a number from 0 to 6, with the proviso that at least one of the radicals $R_3$, $R_4$ and $R_5$ is not hydrogen, to a process for the preparation thereof and to the use thereof in a method of producing mass-coloured plastics or polymeric colour particles.

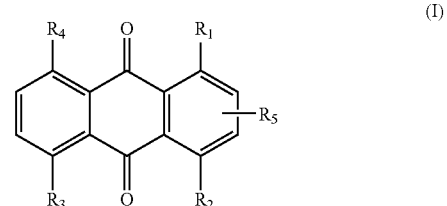

(I)

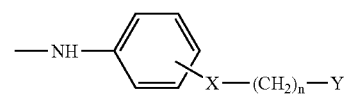

(II)

5 Claims, No Drawings

ANTHRAQUINONE DYES

The present invention relates to novel anthraquinone dyes, to processes for the preparation thereof and to the use thereof in a method of producing mass-coloured plastics or polymeric colour particles.

Dyes, especially dyes of the anthraquinone series, are known for mass-colouring plastics. For example there are described in U.S. Pat. No. 5,367,039 1,4,5,8-tetrasubstituted anthraquinones having (meth)acryloyl groups which can be copolymerised with vinyl monomers and are thus suitable for the production of coloured vinyl polymers.

The dyes used until now do not, however, meet the highest requirements in terms of light fastness and, especially, thermostability.

There is accordingly a need for novel thermostable dyes that produce colorations having a high tinctorial strength and exhibiting light fastness, especially high-temperature light fastness, and that have good all-round fastness properties.

It has now, surprisingly, been found that the dyes according to the invention substantially meet the above criteria.

The present invention accordingly relates to a compound of formula I

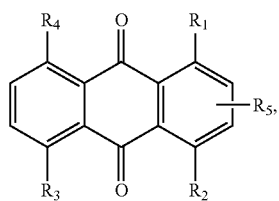

wherein $R_1$ is a radical of formula II

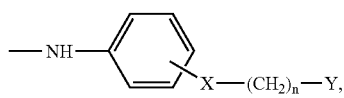

$R_2$ is —$NH_2$ or a radical of formula II, $R_3$ and $R_4$ are each independently of the other hydrogen, hydroxy, —$NH_2$ or a radical of formula II, $R_5$ is hydrogen, halogen or —X—$(CH_2)_n$—Y.

wherein X is a direct bond, —O— or —S—, Y is —H or —$OSO_3H$ and n is a number from 0 to 6, with the proviso that at least one of the radicals $R_3$, $R_4$ and $R_5$ is not hydrogen.

$R_1$ in formula I is preferably a radical of formula II wherein X is a direct bond and n is the number 2.

Preference is also given to compounds of formula I wherein $R_1$ is a radical of formula II in which Y is —OH.

Special preference is given to compounds of formula I wherein $R_1$ is a radical of formula II in which X is a direct bond, n is the number 2 and Y is —OH.

In formula I, $R_2$ preferably has the same meaning as $R_1$ or is $NH_2$.

$R_3$ and $R_4$ in formula I are preferably hydrogen or hydroxy.

$R_5$ in formula I is preferably hydrogen, chlorine or —S—$(CH_2)_2OH$.

Compounds according to the invention to which special preference is given are the compounds of formulae Ia to Ic

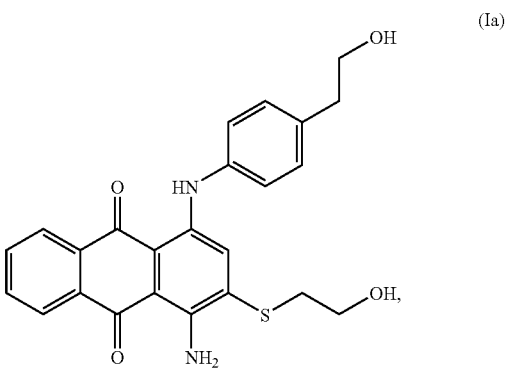

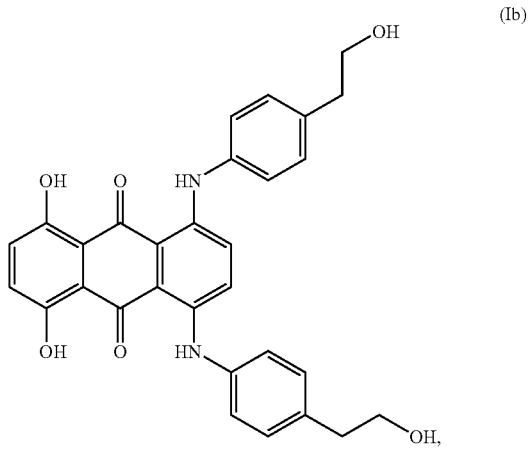

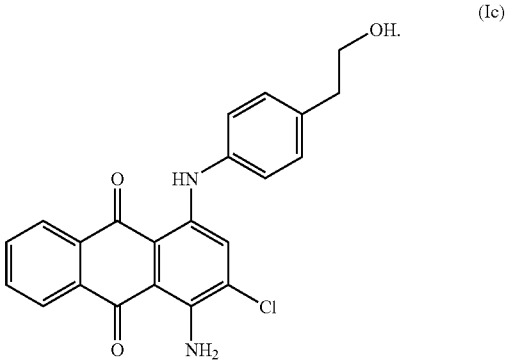

The compounds of formula I are obtainable according to methods known per se from commercially available starting compounds. Suitable starting compounds include, for example, dichloroanthraquinone derivatives, which can be reacted with the appropriate anilines.

Also, leucoquinizarin can be reacted with anilines in the presence of zinc and boric acid in an acid medium to form compounds of formula I.

The invention accordingly relates to a process for the preparation of a compound of the above formula I wherein one of the radicals $R_2$ to $R_4$ is a radical of formula II, which process comprises reacting a compound of formula IIIa, IIIb or IIIc

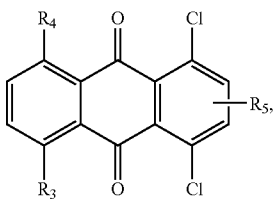

(IIIa)

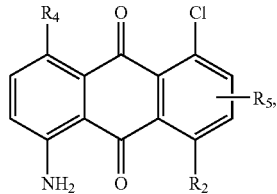

(Vb)

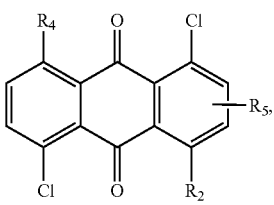

(IIIb)

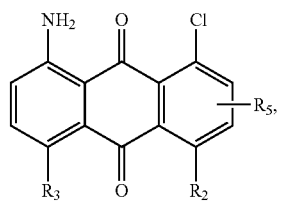

(Vc)

wherein $R_2$ to $R_5$ are as defined hereinabove, with a compound of formula IV

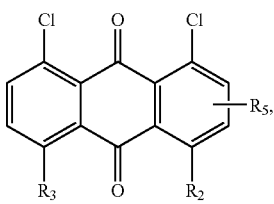

(IIIc)

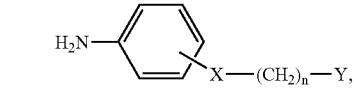

(IV)

wherein X, Y and n are as defined hereinabove.

The anthraquinone derivatives of formulae IIIa-IIIc and Va-Vc and the anilines of formula IV are known or can be prepared in a manner known per se.

The compounds of formula I according to the invention are suitable especially for the production of mass-coloured plastics or polymeric colour particles.

wherein $R_2$ to $R_5$ are as defined hereinabove, with a compound of formula IV The present invention relates also to a method of producing mass-coloured plastics or polymeric colour particles, which method comprises mixing a high molecular weight organic material and a tinctorially effective amount of at least one compound of formula (I).

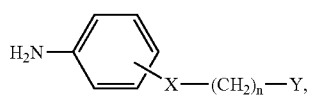

(IV)

wherein X, Y and n are as defined hereinabove.

The invention relates furthermore to a process for the preparation of a compound of formula I wherein one of the radicals $R_2$ to $R_4$ is —$NH_2$, which process comprises reacting a compound of formula Va, Vb or Vc

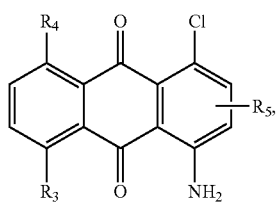

(Va)

The colouring of the high molecular weight organic substances using the dye of formula (I) is carried out, for example, by using roll mills, mixing apparatus or grinding apparatus to admix such a dye with such substrates, the dye being dissolved or finely distributed in the high molecular weight material. The high molecular weight organic material with the admixed dye is then processed according to methods known per se, such as, for example, calendering, compression moulding, extrusion, coating, spinning, pouring or injection moulding, as a result of which the coloured material acquires its final form. Admixture of the dye can also be effected immediately prior to the actual processing step, for example by simultaneously continuously feeding, directly into the intake zone of an extruder, a solid, for example pulverulent, dye and a granulated or pulverulent high molecular weight organic material and, where appropriate, also other ingredients, such as additives, the constituents being mixed in just before being processed. Generally, however, preference is given to mixing the dye into the high molecular weight organic material beforehand, since more uniformly coloured substrates can be obtained.

In order to produce non-rigid shaped articles or to reduce their brittleness, it is frequently desirable to incorporate so-called plasticisers into the high molecular weight compounds prior to shaping. There may be used as plasticisers, for example, esters of phosphoric acid, phthalic acid or sebacic acid. In the method according to the invention, the plasticisers can be incorporated into the polymers before or after the incorporation of the colorant. It is also possible, in order to achieve different colour shades, to add to the high molecular weight organic substances, in addition to the dye of formula I, also other pigments or other colorants in the desired amounts, optionally together with further additives, for example fillers or siccatives.

Preference is given to the colouring of thermoplastic plastics especially in the form of fibres. Preferred high molecular weight organic materials that can be coloured in accordance with the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) or acrylonitrilelbutadiene/styrene (ABS). Polyester and polyamide are especially preferred. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, for example polyethylene terephthalate (PET) or polybutylene terephthalate (PBT); also polycarbonates, e.g. those obtained from α,α-dimethyl-4,4-dihydroxy-diphenylmethane and phosgene, or polymers based on polyvinyl chloride and also on polyamide, for example polyamide 6 or polyamide 6.6.

Since the compounds of formula I according to the invention contain at least two NH groups, mixing the dye with the monomers and incorporation thereof in the form of a comonomer directly into the polymer skeleton is possible, provided that the monomers contain reactive groups that react with the active hydrogen atoms of the NH groups. Examples of such monomers include epoxides (epoxy resins), isocyanates (polyurethanes) and carboxylic acid chlorides (polyamides, polyesters).

The invention accordingly relates also to a method of producing mass-coloured plastics or polymeric colour particles that comprises causing a mixture of at least one monomer that contains at least one NH-reactive group and is capable of polymerisation, polyaddition or polycondensation reactions to react with at least one compound of formula I.

The dyes according to the invention impart to the above-mentioned materials, especially polyester materials, level colour shades of high tinctorial strength that have good in-use fastness properties, especially very good high-temperature light fastness.

The dyes according to the invention can furthermore be used for coating applications of any kind.

The dyes according to the invention can also readily be used together with other dyes to produce blended shades.

The anthraquinone dyes of formula (I) according to the invention are furthermore suitable as colorants in the production of colour filters, especially for visible light in the range from 400 to 700 nm, for liquid crystal displays (LCDs) or charge combined devices (CCDs).

The production of colour filters by sequential application of a red, blue and green colorant to a suitable substrate, for example amorphous silicon, is described in GB-A 2 182 165. The colour filters can be coated, for example, using inks, especially printing inks, that comprise the anthraquinone dyes according to the invention, or can be produced, for example, by blending the anthraquinone dyes according to the invention with chemically, thermally or photolytically structurable high molecular weight material. The further production can be carried out, for example, analogously to EP-A 654 711 by application to a substrate, such as an LCD, followed by photo-structuring and development. Other documents that describe the production of colour filters include U.S. Pat. No. 5,624,467, Displays 14/2, 115 (1993) and WO 98/45756.

The colour filters that are produced for liquid crystal displays (LCD) using the anthraquinone dyes according to the invention are distinguished by high transmission of colour dots.

The invention relates also to the use of an anthraquinone dye according to the invention as a colorant in the production of colour filters.

The following Examples serve to illustrate the invention.

EXAMPLE 1

1,4-Bis[4-(2-hydroxyethyl)phenylamino]-5,8-dihydroxyanthraquinone Ib

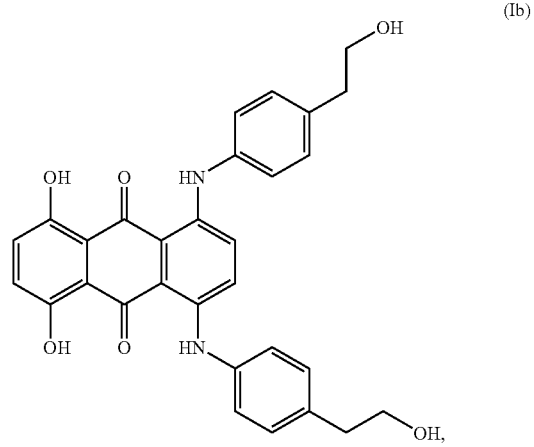

100 g of 2-(4-aminopheny)-ethanol and 20 g of sodium acetate are introduced into a laboratory reaction apparatus and, at 120° C., 20 g of 1,4-dichloro-5,8-dihydroxyanthraquinone are added thereto. The reaction mixture is stirred for 4 hours at 120° C. and then poured into 1.2 litres of 2N hydrochloric acid. The precipitate is filtered off, washed with water until neutral and dried in a vacuum drying chamber.

Yield: 23.8 g (70%)

EXAMPLE 2

1-[4-(2-Hydroxyethyl)phenylamino]-3-chloroaminoanthraquinone Ic

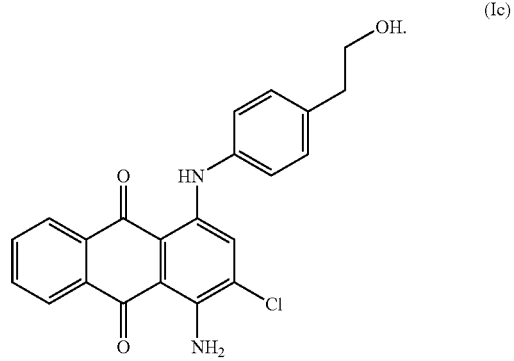

A mixture of 120 g of 2-(4-aminophenyl)-ethanol, 17.8 g of potassium acetate and 40 g of 1-amino-2,4-dichloroanthraquinone are stirred for 24 hours at 180° C. in a laboratory reaction apparatus. After cooling the reaction mixture to room temperature (RT), approximately 0.5 litres of methanol is added. The precipitate is filtered off, recrystallised from ethanol and dried.

Yield: 50.4 g (97%)

EXAMPLE 3

1-[4(2-Hydroxyethyl)phenylamino]-3-(2-hydroxy-ethylmercapto)-4-aminoanthraquinone I*a*

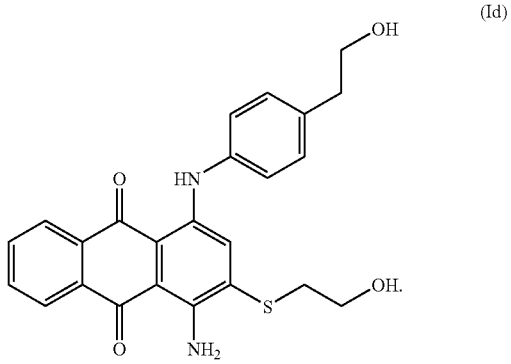

(I*d*)

A mixture of 50.4 g of 1-[4-(2-hydroxyethyl)phenylamino]-3-chloro-4-aminoanthraquinone I*c* from Example 3 and 100 ml of dimethylformamide (DMF) is heated to 80° C. in a laboratory reaction apparatus. A further 50 ml of DMF and 11 g of 2-mercaptoethanol are then added. At an internal temperature of 83° C., 18.6 g of 30% aqueous sodium hydroxide solution are then slowly added dropwise and the mixture is stirred for 3 hours at 80° C. After cooling to RT, the precipitate is filtered off, washed with ethanol and dried in a vacuum drying chamber.

Yield: 23.8 g (47%)

II. Application Examples

II1. Production of a Colour Filter for Liquid Crystal Displays (LCDs)

In a 100 ml glass vessel containing 83.3 g of zirconium ceramic beads, 2.8 g of the anthraquinone dye according to Example 1, 0.28 g of Solsperse® 5000, 4.10 g of Disperbyk® 161 (dispersing agent, 30% solution of a high molecular weight block copolymer, containing groups having affinity for the pigment, in n-butyl acetate/1-methoxy-2-propyl acetate 1:6, BYK Chemie) and 14.62 g of 1-methoxy-2-propyl acetate (MPA), are stirred at 23° C. for 10 minutes at 1000 revs/min. and for 180 minutes at 3000 revs/min. using a Dispermat. After the addition of 4.01 g of an acrylate polymer binder (35% solution in MPA), stirring is carried out at room temperature for 30 minutes at 3000 revs/min. Following removal of the beads, the dispersion is diluted with an equal weight of MPA.

Using a spin-coating apparatus, a glass substrate (Corning type 1737-F) is coated with the resulting dispersion and centrifuged for 30 seconds at 1000 revs/min. The layer is dried on a hot plate for 2 minutes at 100° C. and for 5 minutes at 200° C. The resulting layer thickness is 0.4 μm.

The following anthraquinone dyes (Table 1), which are likewise suitable for mass-colouring plastics, can be prepared analogously to Example 1:

TABLE 1

(I)

| $R_1$ | $R_2$ | $R_3$ | $R_4$ | $R_5$ |
|---|---|---|---|---|
| —NH—C6H4—CH2CH2OH | $NH_2$ | H | H | —S—C6H5 |
| —NH—C6H4—O—CH2CH2OH | $NH_2$ | H | H | —S—C6H5 |
| —NH—C6H4—S—CH2CH2OH | $NH_2$ | H | H | —S—C6H5 |
| —NH—C6H4—CH2CH2OH | $NH_2$ | H | H | —S—CH2CH2OH |

TABLE 1-continued

| $R_1$ | $R_2$ | $R_3$ | $R_4$ | $R_5$ |
|---|---|---|---|---|
| —NH—C₆H₄—O—CH₂CH₂—OH | NH₂ | H | H | —S—CH₂CH₂—OH |
| —NH—C₆H₄—S—CH₂CH₂—OH | NH₂ | H | H | —S—CH₂CH₂—OH |
| —NH—C₆H₄—O—CH₂CH₂—OH | —NH—C₆H₄—O—CH₂CH₂—OH | OH | OH | H |
| —NH—C₆H₄—S—CH₂CH₂—OH | —NH—C₆H₄—S—CH₂CH₂—OH | OH | OH | H |

What is claimed is:

1. A compound of formula I

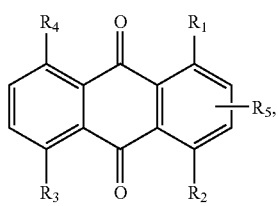

wherein $R_1$ is a radical of formula II

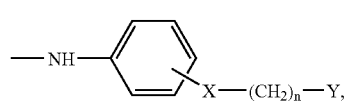

$R_2$ is —NH₂ or a radical of formula II,
$R_3$ and $R_4$ are each independently of the other hydrogen, hydroxy, —NH₂ or a radical of formula II,
$R_5$ is hydrogen, halogen or —X—(CH₂)ₙ—Y,
wherein X is a direct bond, Y is —OH or —OSO₃H and n is a number 2, with the proviso that at least one of the radicals $R_3$, $R_4$ and $R_5$ is not hydrogen.

2. A compound of formula I according to claim 1 wherein Y is —OH.

3. A compound of formula I according to claim 1 wherein $R_3$ and $R_4$ are hydrogen or hydroxy.

4. A compound of formula I according to claim 1 wherein $R_5$ is hydrogen, chlorine or —S—(CH₂)₂—OH.

5. A compound of formula I according to claim 1 according to any one of formulae Ia to Ic

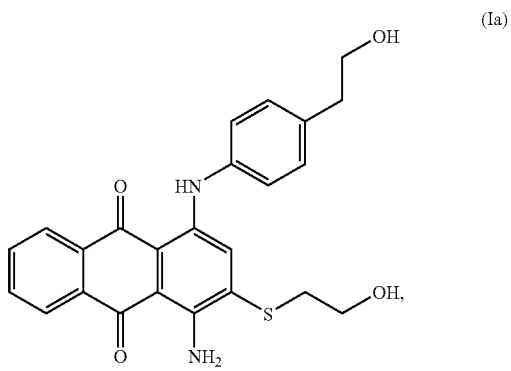

-continued
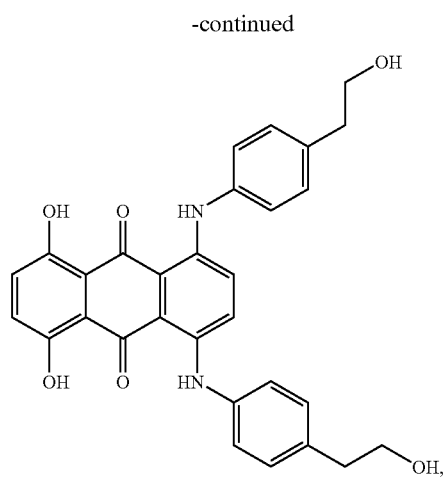 (Ib)
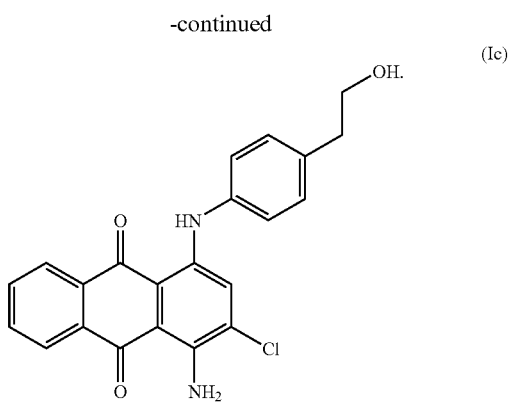 (Ic)
* * * * *